March 23, 1954     F. E. CUE     2,672,897
ADJUSTABLE TAPER RIPPING JIG
Filed July 25, 1952
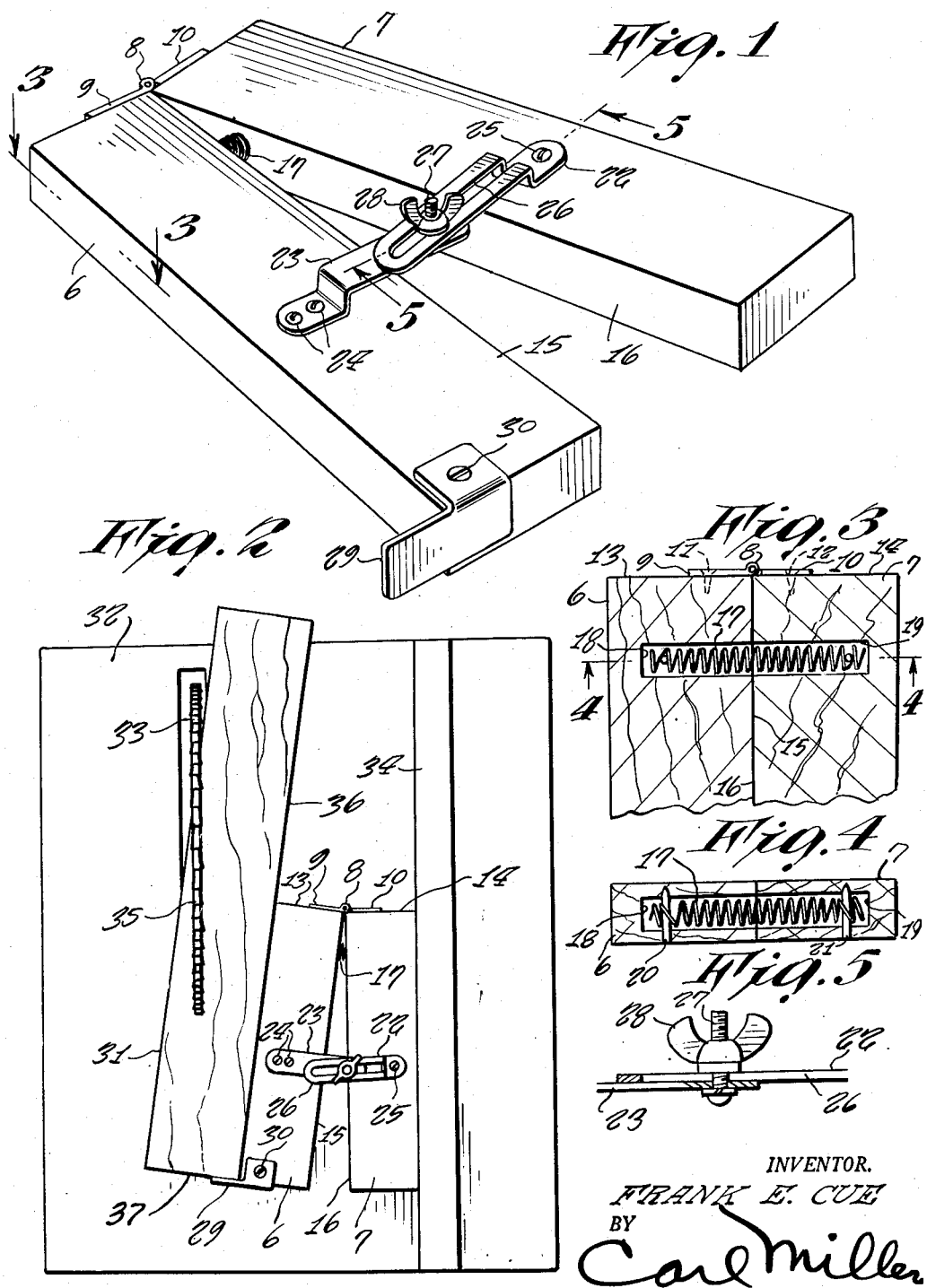
INVENTOR.
FRANK E. CUE
BY Carl Miller
ATTORNEY Patented Mar. 23, 1954

2,672,897

UNITED STATES PATENT OFFICE 2,672,897

ADJUSTABLE TAPER RIPPING JIG

Frank E. Cue, Hollis, N. Y.

Application July 25, 1952, Serial No. 300,859

1 Claim. (Cl. 143—169)

1

The present invention relates to guides, gages and jigs for facilitating the sawing and ripping of boards and lumber in accurate manner, and particularly to an adjustable taper ripping jig.

The main object of my invention is to provide means for accurately guiding pieces of lumber upon the table of a circular rip saw in order to cut the wood along inclined angles to form tapered products.

Another object is to provide such means that are adjustable in order to provide for ripping boards at different angles of inclination to form different selected tapers on the sawed boards.

A further object is to have an adjustable taper guide or jig for quickly setting the desired angle at which a board is to be ripped and which is slidable upon the saw table and capable of pushing the board while guiding the same across the table.

An ancillary object of the invention is to have such a guide or jig that is readily removable from or replaceable upon the table of the saw, at will.

It is also an object to have a guide or jig of the character indicated which is simple to make and simple to use and low in cost, and providing absolute safety of operation with precision results.

Other objects and advantages of my invention will appear in greater detail as the specification proceeds.

In order to facilitate ready comprehension of this invention for a proper appreciation of the salient features thereof, the invention is illustrated on the accompanying drawing forming part hereof, and in which:

Figure 1 is a perspective view of an adjustable taper ripping jig made according to the invention and embodying the same in a practical form;

Figure 2 is a plan view of a circular saw and its table with the jig of the invention in operative position thereon;

Figure 3 is a fragmentary section of the jig as taken on line 3—3 in Figure 1;

Figure 4 is a transverse section as taken on line 4—4 in Figure 3; and

Figure 5 is a transverse section as taken on line 5—5 in Figure 1.

Throughout the views, the same reference numerals indicate the same or like parts.

When boards are to be ripped in generally lengthwise direction or more or less along the grain of the wood, it is, of course common to use a circular rip saw and a rip fence on the saw table. Frequently, it is necessary to rip one edge of a board at an inclined angle or out of parallel to the other edge so as to produce tapered boards and strips. This usually requires some special jigs with fixed angles, which is an inconvenience, because various angles are required, and perhaps only one or two boards are to be cut at any one given angle or inclination.

Upon considering this problem, it has occurred to me that such a guide or jig should be adjustable to any desired angle so as to form as useful a guide as possible and avoiding the necessity of using a series of different guides or jigs. As a result, I have succeeded in producing a special adjustable taper ripping jig along the lines indicated, which will now be described in detail in the following.

Hence, in the practice of my invention, and referring also again to the drawing, the jig referred to primarily includes two substantially similar pieces or blocks 6 and 7 of wood, plastic or rigid composition of any description that will keep its shape. At one end of each, these blocks may be mechanically connected by means of a hinge 8 with its leaves 9 and 10 secured to the blocks by the screws or nails 11 and 12, etc. The mutually adjacent ends 13 and 14 of the blocks thus connected are always intended to remain closely adjacent so that the hinge forms a fulcrum or pivot point about which the blocks may be brought together or separated at various angles. Of course, I may omit the hinge altogether, if I so choose, or I may connect the two parts by means of a leather strap or plastic strip, inasmuch as I use means tending to hold these ends together in any event.

Between the two mutually facing longitudinal edges 15 and 16 of the guide blocks extends a coiled tension spring 17 that has the ends thereof extending into a pair of similar opposite holes or bores 18 and 19 of sufficient depth to receive the entire spring between them when both blocks are brought together with edges 15 and 16 in contact. Near the inner ends of the holes 18, 19, the ends of spring 17 are retained by means of a pair of pins or nails 20, 21, with the spring under sufficient tension to tend to close the blocks together and to draw the ends 13 and 14 together at all times.

Upon the intermediate portion of the two guide blocks are secured a pair of mutually co-operating brackets 22, 23 by means of screws 24, 25, bracket member 22 having a longitudinal slot 26 and the other bracket 23 having an adjustable bolt 27 extending through the end thereof and through slot 26 in bracket member 22, a wing nut 28 serving to tighten the bracket members together in attained position of adjustment. It will be noted that the hole in bracket 23 is threaded, and with the addition of the lock washer, bolt 27 is held rigid. This is an important item as it eliminates any possibility of play and enables instant tightening of wing nut 28. The two screws 24 retain bracket member 23 rigidly in place on block member 6, while the single screw 25 serves as a pivot mounting for bracket member 22 so that it may swing a little to compensate for the arcuate movement of bracket member 23 when bolt 27 slides through the length of slot 26. In any event, angular adjustment of the two guide blocks 6 and 7 may be performed at any time and the relative position of these blocks may then be fixed by tightening wing nut 28.

Upon the near end of block 6 is secured a hook lug 29 by means of a screw 30 for engaging the rear end of a board 31 when it rests on saw table 32 and is ready to be ripped by circular saw 33. Ordinarily, a board would be brought against the rip fence 34 on the saw table, but as this is parallel to the saw 33, the board would be ripped with parallel edges. Now the intention is to rip a side or edge 35 at a taper or inclination to the other edge 36 that is nearer to the rip fence 34. For this purpose, the present jig is first placed on the saw table with guide block 7 sliding against the rip fence, while the board 31 is placed with its edge 36 against guide block 6 and its rear end 37 abutting the hook lug 29 and the jig with the board thus pushed thereby fed along table 32 as guided by the rip fence and the board sawed or ripped to form the inclined or taper edge 35 on the board. The angle of this edge may be adjusted by loosening nut 28 and bringing the guide blocks toward each other or farther apart at their rear ends and the nut again fastened. Brackets 22 and 23 are formed or raised over members 6 and 7, enabling the operator to firmly grip the brackets with his right hand and guide the jig and wood to be cut, thereby releasing use of left hand and insuring safety and freedom from the possibility of left hand coming in contact with saw blade.

Manifestly, variations may be resorted to, and parts may be modified or used without others within the scope of the appended claim.

Having now fully described my invention, I claim:

An adjustable taper ripping jig including a guide block adapted to have one edge thereof brought against a rip fence upon a circular saw table, a second similar guide block disposed at variable angular position with respect to the other or, opposite edge of the first mentioned guide block, means tending to retain one end of each block close to the corresponding end of the other block upon the mutually facing inner edges of the two blocks, a pair of bracket members secured individually upon the intermediate portions of the guide blocks, one bracket member having an adjustable bolt in the free end thereof and the other having an elongated slot thru which said bolt also extends for mutually securing the two blocks in any attained position of relative adjustment, the free end of one bracket overlapping the free end of the other and said free ends being offset from the top surfaces of the guide blocks to provide room for the head of the bolt, and means upon the rear outer end of one guide block for engaging with the rear end of a board to be ripped and pushing said board across said saw table, the said last mentioned means including a hook lug secured upon the said block and extending from one side thereof, the said guide blocks having a pair of mutually registering bores in the mutually facing near edges of the same at a lesser distance from the adjacent ends than from the rear ends of these said blocks, and a spring secured in the said bores.

FRANK E. CUE.

References Cited in the file of this patent

UNITED STATES PATENTS

| Number | Name | Date |
|---|---|---|
| 2,032,976 | Carter | Mar. 3, 1936 |